United States Patent
Mason et al.

(10) Patent No.: US 11,725,747 B1
(45) Date of Patent: Aug. 15, 2023

(54) WATER ARRESTOR VALVE ASSEMBLY

(71) Applicant: NIBCO Inc., Elkhart, IN (US)

(72) Inventors: Christopher W. Mason, Granger, IN (US); Lisa Lyon, North Grafton, MA (US); Andrew J. Terry, Sturbridge, MA (US)

(73) Assignee: NIBCO Inc., Elkhart, IN (US)

( * ) Notice: Subject to any disclaimer, the term of this patent is extended or adjusted under 35 U.S.C. 154(b) by 0 days.

(21) Appl. No.: 17/861,636

(22) Filed: Jul. 11, 2022

(51) Int. Cl.
*F16K 47/02* (2006.01)
*F16K 5/06* (2006.01)
*F16K 24/04* (2006.01)
*F16K 27/06* (2006.01)
*F16L 55/053* (2006.01)

(52) U.S. Cl.
CPC .......... *F16K 47/023* (2013.01); *F16K 5/0605* (2013.01); *F16K 24/04* (2013.01); *F16K 27/067* (2013.01); *F16L 55/053* (2013.01)

(58) Field of Classification Search
CPC ...... F16K 47/02; F16K 47/023; F16L 55/053; F16L 55/052; F16L 55/045; E03C 2201/60
See application file for complete search history.

(56) References Cited

U.S. PATENT DOCUMENTS

| | | | |
|---|---|---|---|
| 5,385,172 A * | 1/1995 | Perrott | F16L 55/053 138/31 |
| 6,302,446 B1 | 10/2001 | Spears | |
| 7,373,953 B2 * | 5/2008 | Minnick | F16K 11/0873 138/30 |
| 7,631,662 B2 | 12/2009 | Reck | |
| 7,681,596 B2 | 3/2010 | Reck | |
| 8,375,991 B2 | 2/2013 | Erhardt | |
| 8,833,394 B2 * | 9/2014 | McCoy | F16K 5/0442 251/288 |
| 10,458,662 B2 | 10/2019 | Olsen et al. | |
| 2004/0124386 A1 | 4/2004 | Carey | |

(Continued)

FOREIGN PATENT DOCUMENTS

| | | |
|---|---|---|
| CN | 203395270 | 1/2014 |
| CN | 205781020 | 12/2016 |

(Continued)

OTHER PUBLICATIONS

The Plumber's Choice, "1-¼ in ×2 in SWG high flow drain ball valve, purge for pipe cleanout, 3-way adjustable flow path, brass," https://www.homedepot.com/p/The-Plumber-s-Choice . . . (Oct. 9, 2020).

(Continued)

*Primary Examiner* — Michael R Reid
(74) *Attorney, Agent, or Firm* — Price Heneveld LLP

(57) ABSTRACT

A water arrestor valve assembly permits the servicing and/or replacement of a water hammer arrestor in a segment of a plumbing system. The water hammer arrestor can be isolated from the incoming and outgoing water supply by a valve or a tee-shaped valve body. In addition, the bleeder drain valve(s) can be located on the tee-shaped valve body to reduce the pressure and drain fluid before removal of the water hammer arrestor and can also be used to isolate, reduce the pressure and drain the length of piping of the fixture/appliance that is downstream of the water hammer arrestor.

20 Claims, 4 Drawing Sheets

(56) References Cited

U.S. PATENT DOCUMENTS

| | | |
|---|---|---|
| 2008/0314466 A1 | 12/2008 | Cimberio et al. |
| 2010/0252129 A1 | 10/2010 | Olsen et al. |
| 2011/0073201 A1 | 3/2011 | Matsui et al. |
| 2013/0269813 A1* | 10/2013 | Jang .................... F16L 55/053 138/30 |
| 2016/0097550 A1 | 4/2016 | Karamanos |
| 2018/0259076 A1 | 9/2018 | Feng et al. |
| 2019/0226592 A1 | 7/2019 | Hussein et al. |

FOREIGN PATENT DOCUMENTS

| | | |
|---|---|---|
| CN | 106958670 | 7/2017 |
| CN | 207195715 | 4/2018 |
| JP | H07301351 | 11/1995 |
| JP | 2020097902 | 6/2020 |

OTHER PUBLICATIONS

Watts, "Series RPVM-1-Press residential purge," flier, Watts.com (2020).

Webstone, "PROPAL Series," Ball Drain Valve brochure, Webstone Company, Inc. (2016).

Webstone, Pro-Pal Series Union Ball Drain, www.webstonevalves.com/default.aspx?page=customer&file=customer/wecoin/customerpages/unionballdrain.htm (2020).

* cited by examiner

WATER ARRESTOR VALVE ASSEMBLY

BACKGROUND OF THE INVENTION

The present invention relates generally to an isolation valve coupled to a water hammer arrestor and, more particularly, to an isolation valve with a tee-shaped body with at least one bleeder drain that is coupled to a water hammer arrestor. Water hammer arrestors are used to absorb the pressure wave, or water hammer, that happens when a quick closing valve shuts and rapidly stops the circulation of water. If such pressure waves are not dispersed, absorbed, and/or otherwise circulated, the pressure wave can damage the plumbing, plumbing fixtures, appliances, etc. causing leaks and/or other damage. A water hammer arrestor has a sliding piston in a tube that is positioned adjacent to an air chamber. The sliding piston can absorb and/or dampen the pressure wave so that the pressure wave does not continue in the plumbing system. The water hammer arrestor may need to be replaced and/or serviced over time. However, the plumbing system may need to be shut down entirely in order to replace or service the water hammer arrestor. Moreover, there typically is no other mechanism to release pressure and drain fluid adjacent to the water hammer arrestor.

Thus, a water hammer arrestor assembly that permits the release of pressure while draining of fluid adjacent to the water hammer arrestor and simplifies the replacement and/or servicing of the water hammer arrestor would be advantageous.

SUMMARY OF THE INVENTION

One aspect of the present invention is a water arrestor valve assembly. The water arrestor valve assembly includes a tee-shaped valve body having a fluid passageway, a first fitting end, a second fitting end, a third fitting end, and at least one bleeder drain port. The water arrestor assembly has a first valve member with a flow diversion member located in the fluid passageway of the tee-shaped valve body. The first valve member opens the fluid passageway between the first fitting end, the second fitting end, and the third fitting end when the first valve member is in a first position. The first valve member opens the fluid passageway between the first fitting end and the third fitting end, while closing the fluid passageway between the second fitting end and both the first fitting end and the third fitting end when the first valve member is in the second position. The first valve member opens the fluid passageway between the second fitting end and the third fitting end, while closing the fluid passageway between the first fitting end and both the second fitting end and the third fitting end when the first valve member is in a third position. A hammer arrestor is coupled to one of the first fitting end, the second fitting end, or the third fitting end. At least one bleeder drain cap is coupled to the at least one bleeder drain port.

Another aspect of the present invention is a valve assembly. The valve assembly has a one-piece tee-shaped valve body with a fluid passageway, a first fitting end, a second fitting end, a third fitting end, and at least one bleeder drain port. The first valve member has a flow diversion member located in the fluid passageway of the tee-shaped valve body at the intersection of the first fitting end, the second fitting end, and the third fitting end. The first valve member opens the fluid passageway between the first fitting end, the second fitting end, and the third fitting end when the first valve member is in a first position. The first valve member opens the fluid passageway between the first fitting end and the third fitting end, while closing the fluid passageway between the second fitting end and both the first fitting end and the third fitting end when the first valve member is in the second position. The first valve member opens the fluid passageway between the second fitting end and the third fitting end, while closing the fluid passageway between the first fitting end and both the second fitting end and the third fitting end when the first valve member is in a third position. A hammer arrestor is coupled to one of the first fitting end, the second fitting end, or the third fitting end.

Yet another aspect of the present invention is a piping assembly. The piping assembly has a tee-shaped valve body with a fluid passageway, a first fitting end, a second fitting end, a third fitting end, and at least one bleeder drain port. The pipe assembly has a first valve member with a flow diversion member located in the fluid passageway of the tee-shaped valve body. The first valve member opens the fluid passageway between the first fitting end, the second fitting end, and the third fitting end when the first valve member is in a first position. The first valve member opens the fluid passageway between the first fitting end and the third fitting end, while closing the fluid passageway between the second fitting end and both the first fitting end and the third fitting end when the first valve member is in the second position. The first valve member opens the fluid passageway between the second fitting end and the third fitting end, while closing the fluid passageway between the first fitting end and both the second fitting end and the third fitting end when the first valve member is in a third position. A hammer arrestor, a water supply line, and an outgoing water supply line, are each coupled to one of the first fitting end, the second fitting end, and the third fitting end.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
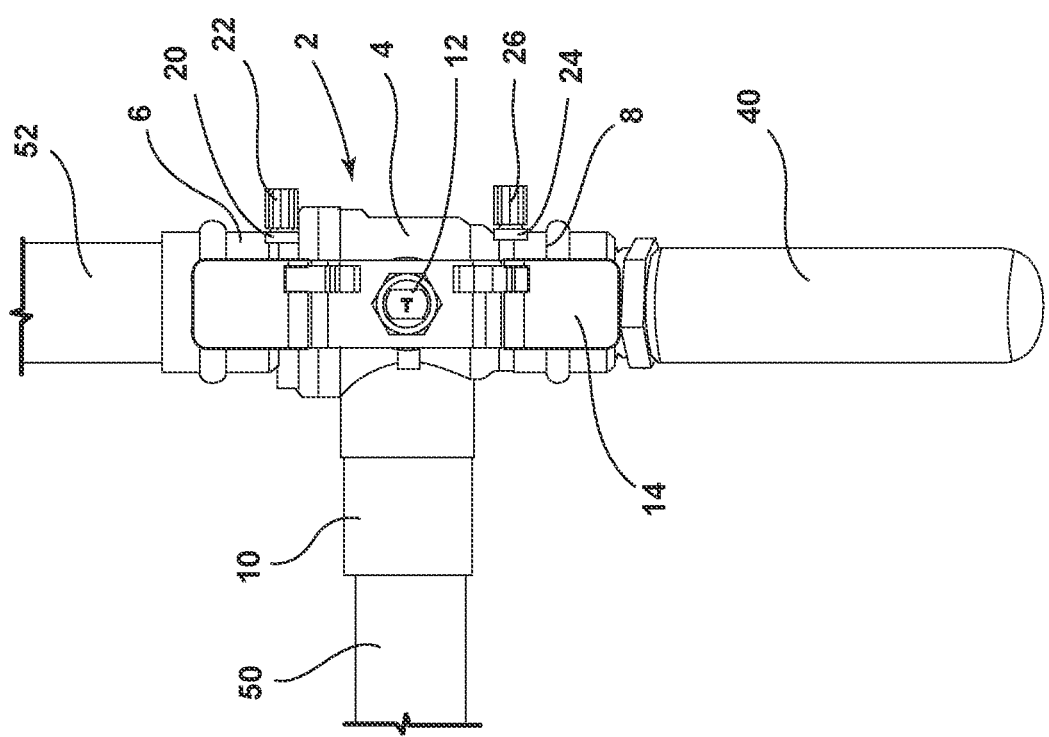
FIG. 1 is a front view of one embodiment of a water arrestor valve assembly.

A water arrestor valve assembly 2 is illustrated in FIG. 1. The water arrestor valve assembly 2 includes a tee-shaped valve body 4 having a fluid passageway F. The tee-shaped valve body 4 has a first fitting end 6, a second fitting end 8, and a third fitting end 10. As illustrated in the Figures, the third fitting end 10 is in the middle section of the tee-shaped valve body 4, thus placing it at an approximately 90 degree angle from the first fitting end 6 and the second fitting end 8. The first fitting end 6 and the second fitting end 8 are approximately 180 degrees apart as they are on opposite sides of the tee-shaped valve body 4.

The water arrestor valve assembly 2 includes a first valve member 12. The first valve member 12 is located at the intersection of the first fitting end 6, second fitting end 8, and third fitting end 10 in the tee-shaped valve body 4. The first valve member 12 includes a ball 16 that is positioned within the fluid passageway F. Seals 13 are positioned between the ball 16 and the tee-shaped valve body 4. The seals 13 help prevent flow of fluid between the ball 16 and the tee-shaped valve body 4. The first valve member 12 also includes a stem 15 that is coupled to the ball 16. The stem 15 can be coupled to a handle 14 by fixing a nut 17 to the stem 15. The handle 14 can be any shape and can include a cover or coating.

Figure 2:
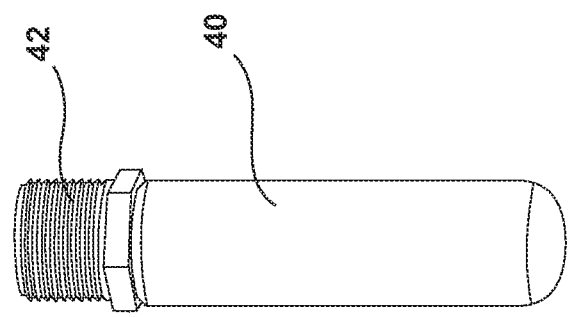
FIG. 2 is a front perspective view of a water arrestor.

The first fitting end 6, second fitting end 8, and third fitting end 10, can be any type of fitting end. For example, the fitting ends 6, 8, 10 could be male pipe thread, female pipe thread, traditional solder, PEX, push-to-connect, press-to-connect, fusion, compression, different sizes, etc. In the illustrated embodiment shown in the Figures, the fitting end that couples with the water hammer arrestor 40 includes a female pipe thread as the water hammer arrestor 40 includes a male pipe thread 42, as illustrated in FIG. 2. However, the water hammer arrestor 40 could be coupled to any type of fitting end.

In the embodiment illustrated in FIGS. 1-5, the water hammer arrestor 40 is coupled to the second fitting end 8. The second fitting end 8 can be integrally formed as part of the tee-shaped valve body 4 or can be a bonnet 19 that is coupled to the third fitting end 10. In the embodiments shown in FIGS. 6-9, the water hammer arrestor 40 is coupled to the third fitting end 10. In FIGS. 6-9, the first fitting end 6 and the second fitting end 8 are illustrated as press fittings with an O-ring 80 that is positioned with an O-ring groove 81.

The tee-shaped valve body 4 includes one or more bleeder drain ports. In the embodiment shown in FIGS. 1 and 9, the tee shaped valve body 4 has a first bleeder drain port 20 located on the first fitting end 6 and a second bleeder drain port 24 located on the second fitting end 8. A first bleeder drain cap 22 is coupled to the first bleeder drain port 20 and a second bleeder drain cap 26 is coupled to the second bleeder drain port 24. In the embodiment shown in FIG. 1, the first bleeder drain cap 22 can be used to release pressure from the water arrestor valve assembly 2 adjacent to the outgoing water supply 52. This allows for the release of pressure and/or draining from the fixture/appliance side of the water arrestor valve assembly 2. The second bleeder drain cap 26 can be used to release pressure adjacent the water hammer arrestor 40. The release of the pressure adjacent the water hammer arrestor 40 can be done to release pressure prior to replacing and/or servicing the water hammer arrestor 40. The bleeder drain ports 20, 24 have a fluid passageway BF that is in fluid communication with fluid passageway F of the tee-shaped valve body 4.

The first valve member 12 is rotatable between three different positions. In the first position, the first valve member 12 opens the fluid passageway F between the first fitting end 6, the second fitting end 8, and the third fitting end 10.

The second position of the first valve member 12 opens the fluid passageway F between the first fitting end 6 and the third fitting end 10, while closing the fluid passageway F between the second fitting end 8 and both the first fitting end 6 and the third fitting end 10.

The third position of the first valve member 12 opens the fluid passageway F between the second fitting end 8 and the third fitting end 10, while closing the fluid passageway F between the first fitting end 6 and both the second fitting end 8 and third fitting end 10.

The three positions of the first valve member 12 can be adjusted to permit isolation of the water hammer arrestor 40 from the incoming water supply 50 and/or the outgoing water supply 52, depending upon which fitting end (6, 8, 10) the water hammer arrestor 40 is coupled to. When the first valve member 12 is in the first position, the water from the incoming water supply 50 flows through all fitting ends (6, 8, 10), thereby permitting the water hammer arrestor 40 to operate to absorb the pressure wave or water hammer that happens when the water supply is interrupted, before or after the tee-shaped valve body 4. When the first valve member 12 is in the second position, the second fitting 8, coupled to the water hammer arrestor 40 is closed. In this position, the incoming water supply 50 continues to run through the tee-shaped valve body 4 to the outgoing water supply 52, permitting for the isolation and replacement/servicing of the water hammer arrestor 40. When the first valve member 12 is in the third position, the incoming water supply 50 remains connected to the water hammer arrestor 40, while the first fitting end 6 is closed. This allows for the isolation of the fixture or appliance that is coupled to the outgoing water supply 52 for service and/or replacement, while keeping the water hammer arrestor 40 coupled to the incoming water supply 50.

Figure 4:
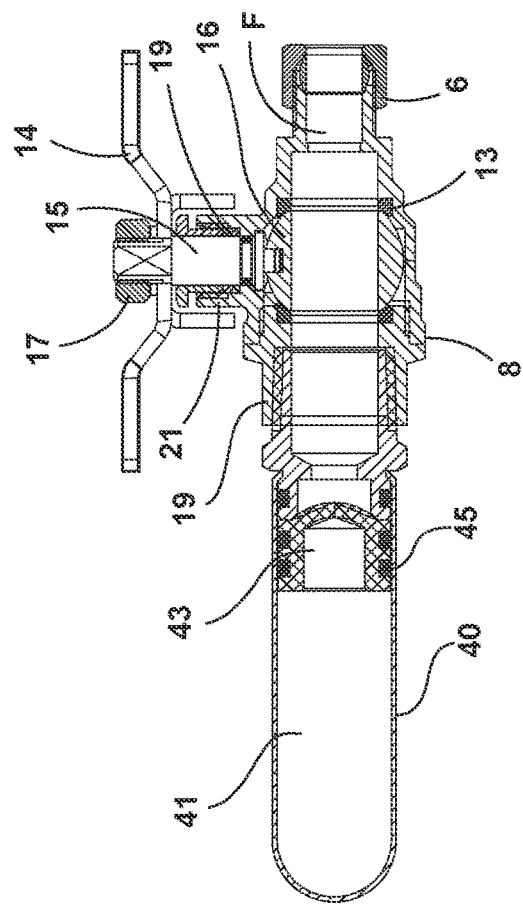
FIG. 4 is a cross-sectional view of the water arrestor valve assembly shown in FIG. 3 taken along the line IV-IV.
Figure 5:
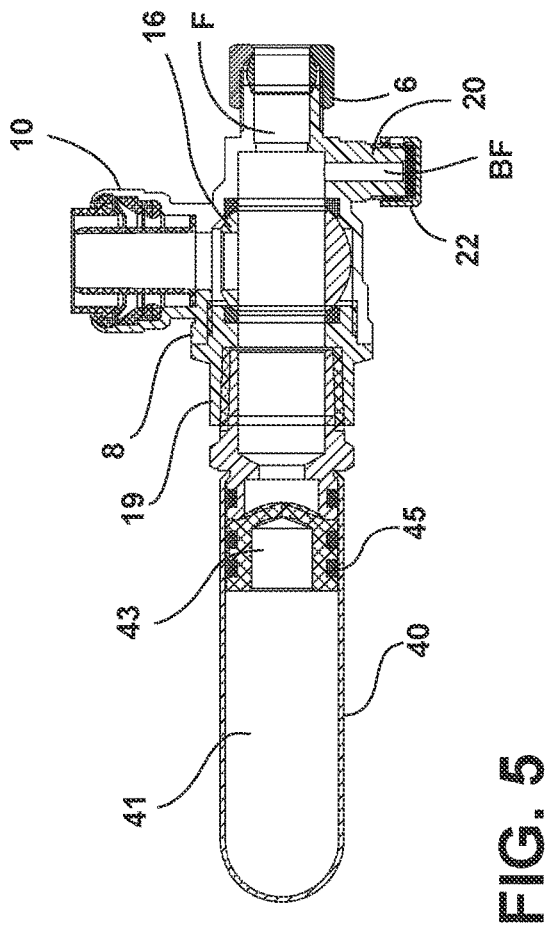
FIG. 5 is a cross-sectional view of the water arrestor valve assembly of FIG. 3 taken along the line V-V.
Figure 3:
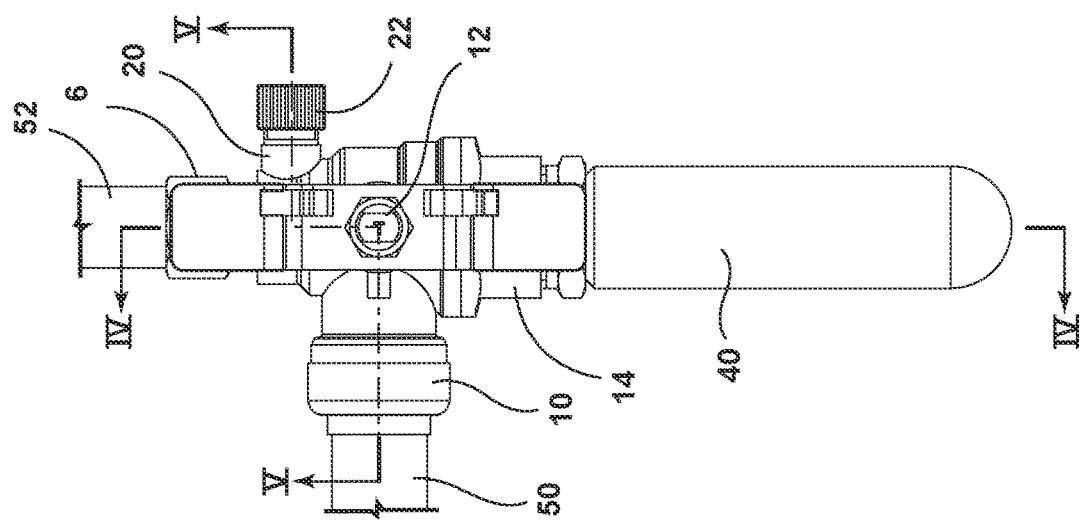
FIG. 3 is a front view of another embodiment of a water arrestor valve assembly.
Figure 7:
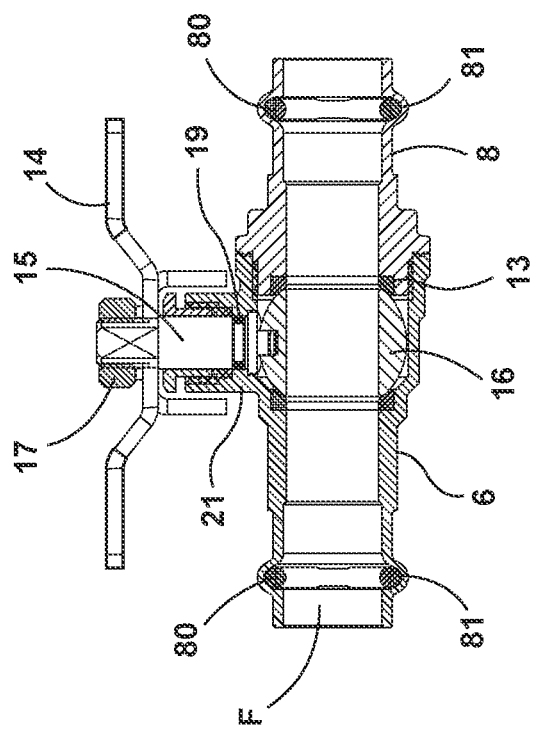
FIG. 7 is a cross-sectional view of the water arrestor valve assembly of FIG. 6 taken along line VII-VII.
Figure 8:
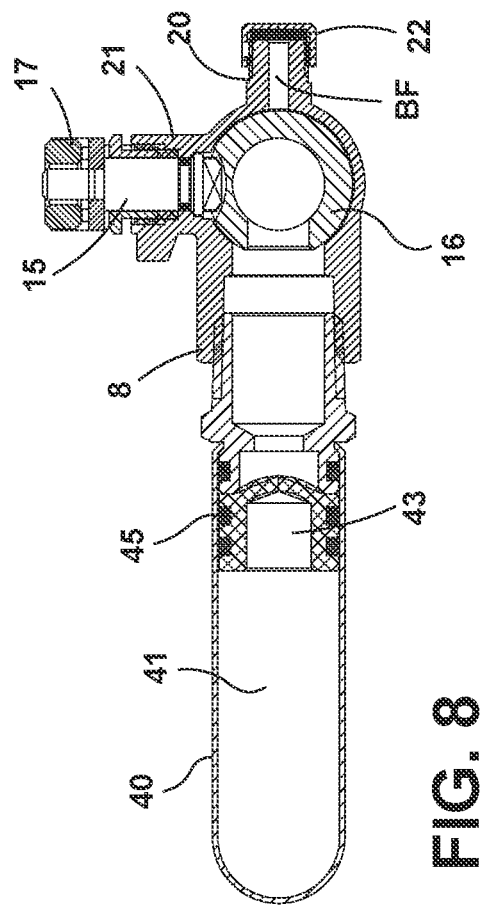
FIG. 8 is a cross-sectional view of the water arrestor valve assembly of FIG. 6 taken along line VIII-VIII.
Figure 6:
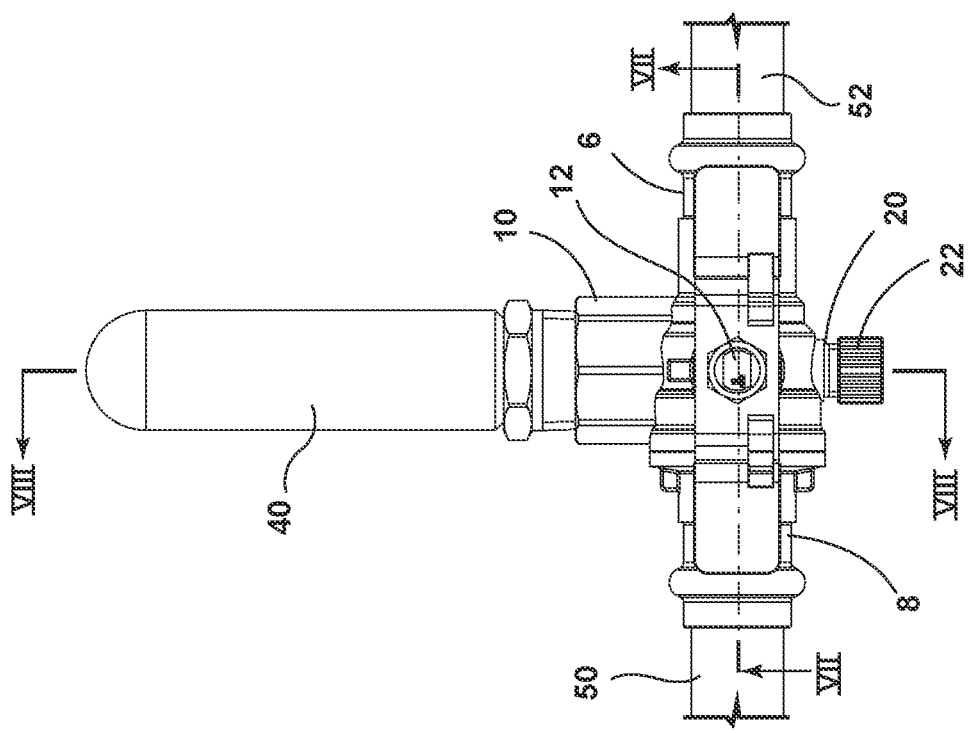
FIG. 6 is a front view of another embodiment of a water arrestor valve assembly.
Figure 9:
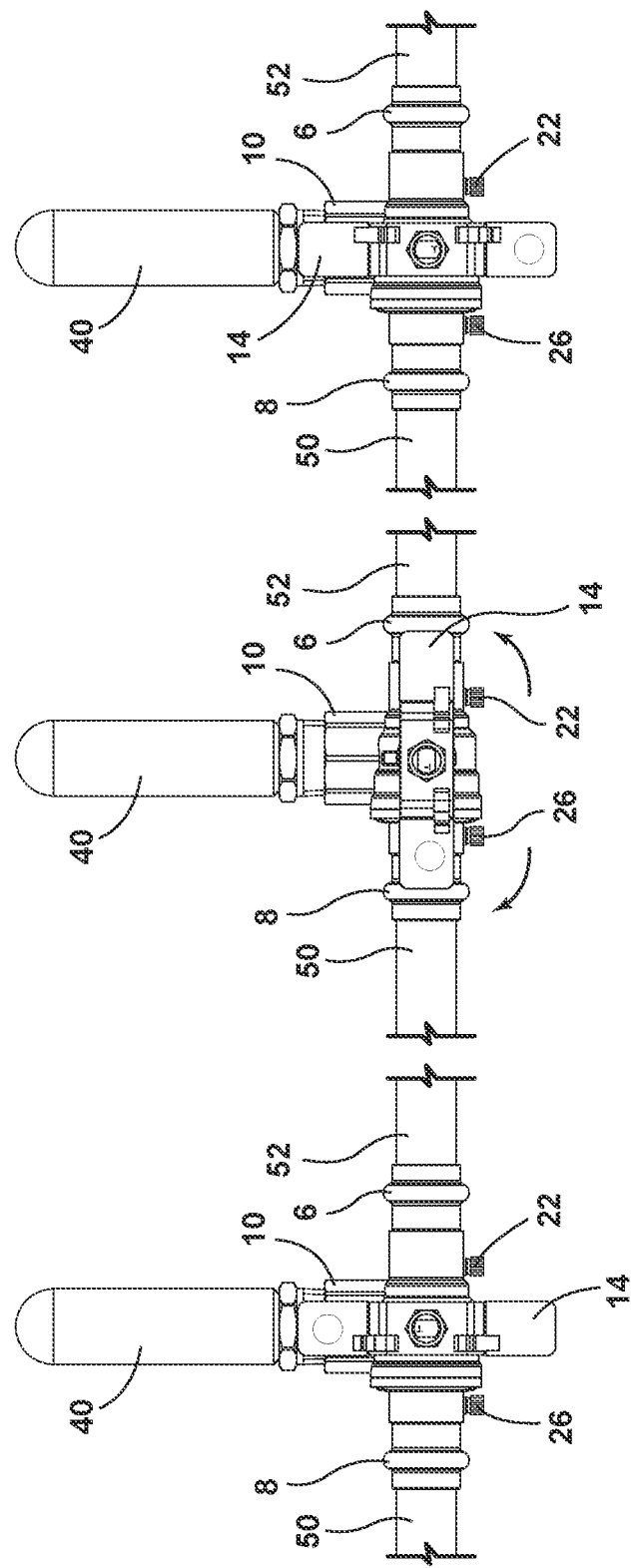
FIG. 9 is a front view of another embodiment of a water arrestor valve assembly showing three different positions of the valve.

The water hammer arrestor 40 includes an air chamber 41 and a sliding piston 43 having O-rings 45, as shown in FIGS. 4, 5, and 8.

The positioning of the water hammer arrestor 40 on the tee-shaped valve body 4 can determine the positioning of the ball 16 of the first valve member 12, such that the valve member positions include isolating the water hammer arrestor 40 from both the incoming and outgoing water supplies 50, 52 to permit the servicing and/or replacement of the water hammer arrestor 40. The illustrated ball 16 has three openings. The ball 16 can be rotated to close none of the fitting ends (6, 8, or 10) or any one of the fitting ends (6, 8, or 10) depending upon the desired arrangement of the water hammer arrestor 40, incoming water supply 50, outgoing water supply 52, etc. For example, in the embodiment shown in FIG. 9, the water hammer arrestor 40 is coupled to the third fitting end 10. The left image shows the ball 16 positioned to close the second fitting end 8, which is coupled to the incoming water supply 50. This isolates the incoming water supply 50 from both the water hammer arrestor 40 and the outgoing water supply 52 that is coupled to the fixture/appliance. The middle image shows the ball 16 permitting flow between all fitting ends 6, 8, and 10. The right image shows the ball 16 closing the fluid passageway F to the first fitting end 6 and the outgoing water supply 52. This isolates the outgoing water supply 52 from the water hammer arrestor 40 and the incoming water supply 50, permitting service and/or replacement of the fixture/appliance. The arrangements shown in FIG. 9 do not show the ball 16 being positioned to close off the third fitting end 10 and the water hammer arrestor 40. However, the ball 16 could be positioned to close the fluid passageway F to the third fitting end 10 in an alternative embodiment. Additionally, the positioning of the first bleeder drain port 20, if it is the only bleeder drain, can be done to relieve the pressure and/or drain the water hammer arrestor 40 or to relieve the pressure and/or drain the fixture/appliance.

As noted above, the designation of which portion of the tee-shaped body 4 is the first fitting end 6, second fitting end 8, or third fitting end 10 is not material as one fitting end is coupled to the incoming water supply 50, one fitting end is coupled to the outgoing water supply 52, and one fitting end is coupled to the water hammer arrestor 40.

The tee-shaped valve body 4 can be formed as a unitary, single piece or can include one or more bonnets 19 at one or more fitting ends 6, 8, and/or 10. The bonnets 19 can be coupled to the reminder of the tee-shaped valve body 4 by threading or other coupling. The tee-shaped valve body 4 can be made from metal or other suitable material. For example, the tee-shaped valve body 4 may be made from brass alloy.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A water arrestor valve assembly, comprising:
   a tee-shaped valve body having a fluid passageway, a first fitting end, a second fitting end, and a third fitting end and at least one bleeder drain port;
   a first valve member with a flow diversion member located in said fluid passageway of said tee-shaped valve body;
      wherein said first valve member opens said fluid passageway between said first fitting end, said second fitting end, and said third fitting end when said first valve member is in a first position;
      wherein said first valve member opens said fluid passageway between said first fitting end and said third fitting end, while closing the fluid passageway between said second fitting end and both said first fitting end and said third fitting end when said first valve member is in the second position;
      wherein said first valve member opens said fluid passageway between said second fitting end and said third fitting end, while closing the fluid passageway between said first fitting end and both said second fitting end and said third fitting end when said first valve member is in a third position;
   a hammer arrestor coupled to one of said first fitting end, said second fitting end, or said third fitting end; and
   at least one bleeder drain cap coupled to said at least one bleeder drain port.

2. The water arrestor valve assembly of claim 1, wherein said hammer arrestor is coupled to said second fitting end, a water supply is coupled to said third fitting end, and an outgoing water supply is coupled to said first fitting end.

3. The water arrestor valve assembly of claim 1, wherein said hammer arrestor is coupled to said third fitting end, an incoming water supply is coupled to said second fitting end, and an outgoing water supply is coupled to said first fitting end.

4. The water arrestor valve assembly of claim 1, wherein said at least one bleeder drain port includes a first bleeder drain port positioned in said first fitting end.

5. The water arrestor valve assembly of claim 4, wherein said at least one bleeder drain port includes a second bleeder drain port positioned on said second fitting end.

6. The water arrestor valve assembly of claim 1, wherein said at least one bleeder drain port includes a first bleeder drain port positioned on said tee-shaped valve body opposite said third fitting end.

7. The water arrestor valve assembly of claim 6, wherein said hammer arrestor is coupled to said third fitting end.

8. A valve assembly, comprising:
a one-piece tee-shaped valve body having a fluid passageway, a first fitting end, a second fitting end, and a third fitting end and at least one bleeder drain port;
a first valve member with a flow diversion member located in said fluid passageway of said tee-shaped valve body at the intersection of said first fitting end, said second fitting end, and said third fitting end;
wherein said first valve member opens said fluid passageway between said first fitting end, said second fitting end, and said third fitting end when said first valve member is in a first position;
wherein said first valve member opens said fluid passageway between said first fitting end and said third fitting end, while closing the fluid passageway between said second fitting end and both said first fitting end and said third fitting end when said first valve member is in the second position;
wherein said first valve member opens said fluid passageway between said second fitting end and said third fitting end, while closing the fluid passageway between said first fitting end and both said second fitting end and said third fitting end when said first valve member is in a third position; and
a hammer arrestor coupled to one of said first fitting end, said second fitting end, or said third fitting end.

9. The valve assembly of claim 8, wherein said hammer arrestor is coupled to said second fitting end, a water supply is coupled to said third fitting end, and an outgoing water supply is coupled to said first fitting end.

10. The valve assembly of claim 8, wherein said hammer arrestor is coupled to said third fitting end, an incoming water supply is coupled to said second fitting end, and an outgoing water supply is coupled to said first fitting end.

11. The valve assembly of claim 8, wherein said at least one bleeder drain port includes a first bleeder drain port positioned in said first fitting end.

12. The valve assembly of claim 11, wherein said at least one bleeder drain port includes a second bleeder drain port positioned on said second fitting end.

13. The valve assembly of claim 8, wherein said at least one bleeder drain port includes a first bleeder drain port positioned on said tee-shaped valve body opposite said third fitting end.

14. The valve assembly of claim 13, wherein said hammer arrestor is coupled to said third fitting end.

15. A piping assembly, comprising:
a tee-shaped valve body having a fluid passageway, a first fitting end, a second fitting end, and a third fitting end and at least one bleeder drain port;
a first valve member with a flow diversion member located in said fluid passageway of said tee-shaped valve body;
wherein said first valve member opens said fluid passageway between said first fitting end, said second fitting end, and said third fitting end when said first valve member is in a first position;
wherein said first valve member opens said fluid passageway between said first fitting end and said third fitting end, while closing the fluid passageway between said second fitting end and both said first fitting end and said third fitting end when said first valve member is in the second position;
wherein said first valve member opens said fluid passageway between said second fitting end and said third fitting end, while closing the fluid passageway between said first fitting end and both said second fitting end and said third fitting end when said first valve member is in a third position; and
a hammer arrestor, a water supply line, and an outgoing water supply line, each coupled to one of said first fitting end, said second fitting end, and said third fitting end.

16. The piping assembly of claim 15, wherein said hammer arrestor is coupled to said second fitting end, said water supply line is coupled to said third fitting end, and said outgoing water supply line is coupled to said first fitting end.

17. The piping assembly of claim 15, wherein said hammer arrestor is coupled to said third fitting end, said incoming water line supply is coupled to said second fitting end, and said outgoing water supply line is coupled to said first fitting end.

18. The piping assembly of claim 15, wherein said at least one bleeder drain port includes a first bleeder drain port positioned in said first fitting end.

19. The piping assembly of claim 18, wherein said at least one bleeder drain port includes a second bleeder drain port positioned on said second fitting end.

20. The piping assembly of claim 15, wherein said at least one bleeder drain port includes a first bleeder drain port positioned on said tee-shaped valve body opposite said third fitting end.

* * * * *